United States Patent [19]

Cleary

[11] Patent Number: 5,605,650
[45] Date of Patent: Feb. 25, 1997

[54] SECURITY OF ARTICLES, GOODS, VEHICLES OR PREMISES

[75] Inventor: Micheal Cleary, Thurstaston, United Kingdom

[73] Assignee: Probe FX Patents Limited, West Midlands, United Kingdom

[21] Appl. No.: 211,245

[22] PCT Filed: Oct. 2, 1991

[86] PCT No.: PCT/GB91/01697

§ 371 Date: Mar. 30, 1994

§ 102(e) Date: Mar. 30, 1994

[87] PCT Pub. No.: WO93/07233

PCT Pub. Date: Apr. 15, 1993

[51] Int. Cl.$^6$ .............. C09K 11/02; C09K 11/06
[52] U.S. Cl. ............. 252/301.35; 252/301.16; 427/1; 106/21 R
[58] Field of Search ............ 252/301.16, 301.19, 252/301.35, 301.21, 301.24, 301.32, 305; 427/1; 106/21 R

[56] References Cited

U.S. PATENT DOCUMENTS

| | | | |
|---|---|---|---|
| 2,871,697 | 2/1959 | Sockman | 252/301.19 |
| 3,335,137 | 8/1967 | Bolotin et al. | 252/301.16 |
| 3,640,889 | 2/1972 | Stewart | 252/301.16 |
| 3,666,680 | 5/1972 | Briggs | 252/301.21 |
| 3,830,682 | 8/1974 | Rowland | 428/142 |
| 4,141,748 | 2/1979 | Matsunaga et al. | 252/305 |

FOREIGN PATENT DOCUMENTS 1381973  1/1975  United Kingdom.

*Primary Examiner*—Ellen M. McAvoy
*Assistant Examiner*—Alan D. Diamond
*Attorney, Agent, or Firm*—Dennison, Meserole, Pollack & Scheiner

[57] ABSTRACT

A method is disclosed for detecting tampering, comprising applying to at least a portion of a surface of an object a composition comprising at least one fluorescent material and a solvent medium for the fluorescent material, the solvent medium containing a volatile solvent, and the composition being colorless, odorless and having no feel upon application as a film to the surface of the object, and being capable of transfer from the surface of the object to another surface; and directly transferring the composition from the object to a person tampering with the object.

21 Claims, No Drawings

SECURITY OF ARTICLES, GOODS, VEHICLES OR PREMISES

This application is a 371 of PCT/GB91/01697 filed Oct. 2, 1991.

The present invention concerns improvements in or relating to the security of articles, goods, vehicles or premises. More particularly, the present invention provides a composition and method for the prevention of those acts listed hereunder utilising a combination of deterrence and also identification of those involved in:

a) Unauthorised removal of articles or goods including cash from vehicles, buildings and/or premises, b) Vandalism of articles, goods, buildings and/or premises.

c) Unauthorised entry into restricted areas.

d) Acts, possibly violent, by groups or organisations against state, military, police or public property or personnel.

Unauthorised removal or stealing of articles or goods is an increasing problem. A recent survey has shown that the stealing of articles or goods is predominantly based on opportunism. Such survey showed that unauthorised removal of articles or goods was carried out in a ratio of opportunists to hardened criminals of 80%:20%.

One situation in which unauthorised removal of articles or goods have taken place is in buildings such as parcel distribution centres, warehouses, storage depots, department stores and like buildings. In such locations articles or goods, suitably in the form of parcels, are constantly transported throughout the buildings. During such transportation, it has been discovered that certain parcels have been stolen. In such situation, it is often difficult to catch the thief, particularly when there are a large number of employees operating in the building concerned. In addition to pilfering of articles or goods, in certain circumstances, vandalism has been a problem with the articles or goods not having been stolen but, rather, damaged instead.

Another situation in which unauthorised removal of articles or goods have taken place is in connection with robbery of articles or goods from premises or vehicles. Such unauthorised removal is an increasing problem and it is often difficult for authorities to convict a thief or burglar since it not always possible to prove that the thief or burglar was present at a particular robbery.

Various types of chemicals have been considered for application to the surface of an article, goods or premises. A composition utilising a dyestuff has been proposed, but same is not considered appropriate since the dye can be seen on the article, goods or premises. Another prior arrangment relates to the use of a fluorescent material dispersed in a carrier. The solid fluorescent material is dispersed in a grease and is then smeared onto surfaces or articles liable to unwanted attention. The disadvantages of such arrangement is that the material when applied is greasy or slippy to the touch, and that same is granular because of undissolved particles present therein. Accordingly, the present invention is based on the provision of a composition and method whereby, when such composition is applied to a surface, same cannot be seen; however, when a person touches such surface then that person can be identified.

It is an object of the present invention to provide a composition and method for reducing unauthorised removal of, or damage to, articles or goods or for preventing damage to property.

It is a further object of the present invention to provide a composition and method whereby, when the composition has been applied to a surface, any person who touches such surface can be identified.

It is a still further object of the invention to provide a composition and method for use in buildings and/or premises or with vehicles, wherein said composition is utilised in a sprinkler or like spray system, for identifying the thief or burglar.

According to the present invention there is provided a composition for preventing unauthorised removal of or damage to articles or goods from vehicles, buildings and/or premises or for preventing damage to premises, said composition being colourless, odourless and having no feel thereto, and thereby being undetectable, said composition comprising at least one fluorescent material together with a solvent medium therefor, said medium containing a volatile component said composition, in use, being applied to at least a portion of the surface of such articles or goods or container therefor, or at least a portion of the surface of a property or surrounding area, whereby in use, when the articles or goods have been stolen or damaged, or the property damaged, the fluorescent material is transferred to the person concerned, which person can then be identified by the use of a UV-light emitting means.

Also according to the present invention there is provided a method for preventing unauthorised removal of or damage to articles or goods from vehicles, buildings and/or premises, or for preventing damage to premises, comprising applying to at least a portion of the surface of said articles or goods, or at least a portion of a property or surrounding area, or storing ready for application to said surfaces, a composition according to the invention, whereby when the articles or goods have been stolen or damaged, or the property damaged, the fluorescent material(s) contained in such composition is/are transferred to the person involved, which person can then be identified by the use of UV-light.

Said composition may further include one or more trace elements which can be changed on a batch basis thereby permitting different batches to be selectively identified, and thereby negating any defence of accidental contact on previous occasions.

The composition can include one or more of any suitable fluorescent materials. However, it has been found that coumarin, oxazinone, and stilbene derivatives are preferred, but fluorescein derivatives can also be utilised.

It is possible to utilise coumarin derivatives, preferably 7-hydroxy-4-methyl coumarin or 7-diethylamino-4-methyl coumarin. Fluorescein derivatives, preferably sodium fluorescein are also utilisable.

It is possible to utilise a fluorescent material which when exposed to UV light fluoresces in a particular colour, each particular fluorescent material being selected for a particular customer, so that when the composition containing the selected fluorescent material is applied to a surface of articles or goods, then any unauthorised removal of such articles or goods can be linked back to the particular customer as the source of goods. This is of use when a thief or burglar is apprehended and the fluorescent material which was transferred to the thief or burglar is identified by the use of UV-light thereby linking the thief or burglar with a particular location.

It is further possible to utilise a combination of two fluorescent materials having differing max absorption or emission frequencies. It is possible to identify said two materials by utilising a UV-absorption spectrum or a fluorescent emission spectrum. Accordingly, such combination of fluorescent materials, when applied to a surface of articles or goods and when transferred to a thief or burglar, can positively link the thief or burglar with a particular location, with no chance of a pleading by the thief or burglar that he had picked up or touched fluorescent material accidentally or innocently.

The fluorescent material is preferably utilised in spray form and can be combined with various solvent systems and surfactants. The fluorescent material is suitably present in an amount of 0.1 to 40% by weight of the composition.

The solvent medium preferably comprises a mixture of volatile and non-volatile solvents. The volatile solvent is preferably a low boiling alcohol, preferably isopropyl alcohol or t-butanol. The non-volatile solvent is preferably isopropyl myristate or glycerol trioleate.

In the case of an aerosol, the composition will also include a propellant, suitably butane and suitably one or more surfactants. The surfactant is preferably polyethylene glycol or polypropylene glycol.

A preferred composition for use in the invention comprises a mixture of a fluorescent material together with isopropyl alcohol as the volatile solvent and isopropyl myristate as the non-volatile solvent. When applied in spray form the isopropyl alcohol evaporates leaving a film of fluorescent material and isopropyl myristate applied to a selected surface.

It is believed that such combination of solvents is effective either, as the isopropyl alcohol evaporates the fluorescent material becomes supersaturated in the isopropyl myristate layer, or as the isopropyl alcohol evaporates the fluorescent material comes out of solution in a mirocrystalline state due to the cooling effects of the evaporating isopropyl alcohol. In either event, a substantial amount of fluorescent, material is present in a very thin layer which cannot be felt, seen or smelt.

Furthermore, when using isopropyl myristate any discolouring or yellowing of the fluorescent material is prevented. Such yellowing is believed due to a photocyclodinerisation reaction of the fluorescent material which is less pronounced in the low polarity long chain isopropyl myristate which is used to the composition of the invention.

A preferred aerosol composition comprises 0.5 gm of fluorescent material, 2.5 gm of isopropyl myristate and 12 ml of isopropyl alcohol in a 150 ml aerosol can. Such composition stays active on the material to which it is applied.

In an embodiment of the invention, the composition is applied immediately prior to an article, such as a dummy parcel, passing through a particular section of a department store or warehouse. The composition is suitably in aerosol form and can be sprayed onto the dummy parcel. In such case, the composition applied to the dummy parcel would be undetectable by sight, touch or smell.

Should the dummy parcel be stolen or be damaged then the employees could be brought together and then the hands of each person in turn would be scanned by UV-light. The thief or vandal would have fluorescent material on his or her hands or clothing and could be so identified.

It can thus be seen that, by utilising the composition and method of the present invention, a thief and/or vandal can be identified. The fluorescent material of the composition of the present invention will remain on the fingers of the thief or vandal after the article or goods have been removed and possibly hidden, whereas previously such would not have been the case.

The composition and method of the present invention can be applied in any situation wherein unauthorised removal of or damage to, an article may take place, for example, in the case of transport of goods by motor vehicle, train or aeroplane.

In such situations, it is preferable to use the fluorescent material utilised in the composition of the invention in sprinkler systems employed in vehicles used for moving articles or goods and in premises for storing or displaying articles or goods.

When such sprinkler system is utilised in premises, the sprinkler system is operated by a burglar alarm and when activated the articles or goods in such premises in store or on display are sprayed with the fluorescent material as would be any personnel involved in the burglary.

A similar sprinkler system could be utilised with vehicles, particularly road vehicles, and be activated by unauthorised entry into the vehicle.

The fluorescent material used in such sprinkler systems can be water based either as a solution or as a suspension. The solutions preferably comprises fluorescein derivatives, coumarin derivatives or diamino stilbene disulphonic acid derivatives at 0.1–20% solutions in the presence of a polymer latex. The suspension preferably comprises an oxazinone derivative of 0.1–20% in aqueous suspension stabilised by anionic surfactants and in the presence of a polymer latex.

The polymer latex is chosen so that it becomes water insoluble on drying, possibly through some type of cross linking mechanism to which end a cross-linking agent may also be added. Trace elements may be used which would normally be water soluble but are held in place by the polymer matrix. Different polymers may also be used and identified subsequently and therefore also act as 'trace elements'. Polymer combinations may also be used and it can thus be seen that a vast range of permutations are available through this and by varying the trace element.

The composition and method of the present invention would suitably be utilised accompanied by warning notices etc., to indicate to any potential thief and/or vandal that the person who removes a particular parcel can be identified.

Any suitable UV-light emitting means can be utilised in the present invention.

Whilst specific reference has been made to a thief and/or vandal, it is clear that the composition and method of the invention can also be used in identifying a person involved in certain criminal activities. Also, warning notices could also be provided to indicate to any potential criminal that crime prevention measures are in place and that the criminal may be identified.

I claim:

1. A method for detecting tampering, comprising applying to at least a portion of a surface of an object a composition comprising at least one fluorescent material and a solvent medium therefor, said solvent medium containing a volatile solvent and said composition being colorless, odorless and having no feel thereto upon application as a film to the surface of said object, and being capable of transfer from the surface of said object to another surface, and directly transferring said composition from said object to a person tampering therewith.

2. A method as claimed in claim 1, wherein said tampering comprises unauthorized entering of a property or vehicle.

3. A method as claimed in claim 1, additionally comprising detecting said composition on the person by irradiation with a source of ultraviolet light.

4. A method as claimed in claim 1, additionally comprising preparing individual batches of said composition, each including one or more trace elements as an identifier of the batch.

5. A method as claimed in claim 1, wherein said at least one fluorescent material comprises first and second fluorescent materials having differing max absorption or emission frequencies.

6. A method as claimed in claim 1, wherein said at least one fluorescent material comprises a fluorescent material selected from the group consisting of coumarin, oxazinone, stilbene and fluorescein compounds.

7. A method as claimed in claim 6, wherein the coumarin compound is selected from the group consisting of 7-hydroxy-4-methyl coumarin and 7-diethylamino-4-methyl coumarin.

8. A method as claimed in claim 1, wherein said at least one fluorescent material is present in an amount of 0.1 to 40% by weight of the composition.

9. A method as claimed in claim 1, wherein the fluorescent material fluoresces at a selected color.

10. A method as claimed in claim 1, wherein the fluorescent material is applied in spray form.

11. A method as claimed in claim 10, wherein the solvent medium comprises a mixture of volatile and non-volatile solvents.

12. A method as claimed in claim 11, wherein the volatile solvent is an alcohol.

13. A method as claimed in claim 12, wherein the volatile solvent is isopropyl alcohol.

14. A method as claimed in claim 11, wherein the non-volatile solvent is isopropyl myristate.

15. A method as claimed in claim 11, wherein the composition additionally comprises a propellant to enable applying in aerosol form.

16. A method as claimed in claim 1, wherein the composition is a water based solution or suspension.

17. A method as claimed in claim 16, wherein the composition comprises a solution of a fluorescein compound or a diamino stilbene disulphonic acid compound in an amount of 0.1 to 20% by weight in a polymer latex.

18. A method as claimed in claim 16, wherein the composition is a suspension comprising an oxazinone compound at a level of 0.1 to 20% by weight stabilized by an anionic surfactant, and in the presence of a polymer latex.

19. A method as claimed in claim 1, wherein the composition additionally comprises a surfactant.

20. A method as claimed in claim 19, wherein the surfactant is polyethylene glycol or polypropylene glycol.

21. A composition for detecting tampering comprising 0.1 to 20% of a fluorescent oxazinone compound in aqueous suspension stabilized by an anionic surfactant and in the presence of a polymer latex, said composition being colorless, odorless and having no feel thereto, and being capable of transfer from one surface to another.

* * * * *